March 26, 1935.  J. McLELLAND  1,995,315

ROLLER

Filed Jan. 15, 1934

INVENTOR.
James McLelland
BY Frank J Schraeder Jr
ATTORNEY.

Patented Mar. 26, 1935

1,995,315

UNITED STATES PATENT OFFICE 1,995,315

ROLLER

James McLelland, Elmwood Park, Ill.

Application January 15, 1934, Serial No. 706,604

8 Claims. (Cl. 208—181)

This invention relates to improvements in rollers and has particular reference to roller skate rollers.

An important object of my invention is to provide a roller having a double tread portion or rim to thereby prolong its usefulness by increasing its wearing quality.

Another object of my invention resides in the provision of a roller having a pair of side plates rotatably mounted on a hub and a tread member adapted for retaining said plates together.

Still another object of my invention is found in the provision of a tread member formed with integral spaced extensions which are adapted to be projected through said side plates and then deformed at their ends to provide rivet-like retaining means for said tread member and said side plates.

With the above and other objects in view, my invention consists in the novel combination, construction and arrangement of the parts and members shown in preferred embodiment in the attached drawing, described in the following specifications, and particularly pointed out in the appended claims.

Referring to the drawing.

Figure 1:
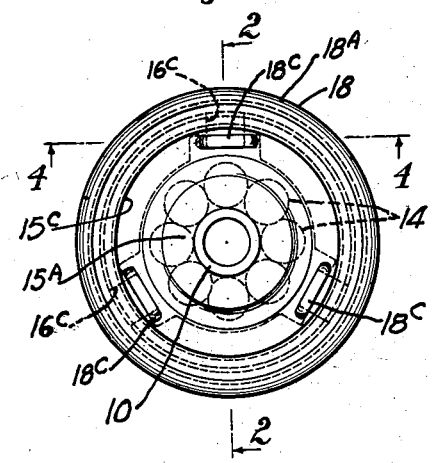
Fig. 1 is a side elevation of a roller embodying my invention.
Figure 2:
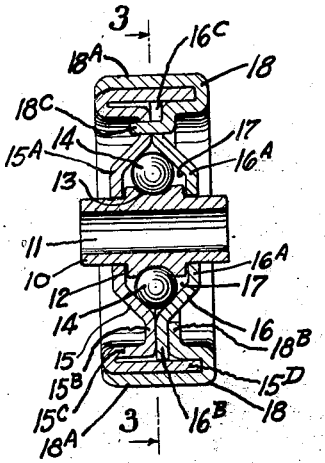
Fig. 2 is a vertical section taken on line 2—2 of Fig. 1.
Figure 3:
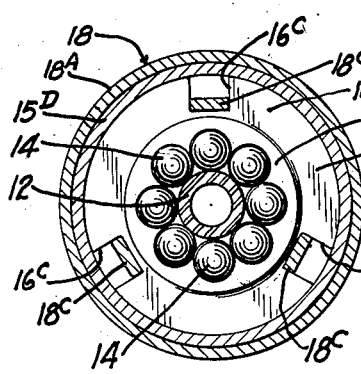
Fig. 3 is a vertical section taken on line 3—3 of Fig. 2.

As shown in the illustrations, my roller invention includes generally a hub 10 a pair of web members 15 and 16 and a combined outer tread and retainer 18.

The hub 10 is provided with a bore 11 and an enlarged portion 12 provided with a concave raceway 13.

The web members 15 and 16 are preferably steel plate stampings held in juxta-position and having their inner marginal portions 15$^A$ and 16$^A$ spread apart to form a housing 17 for a plurality of ball bearings 14 and said portions 15$^A$ and 16$^A$ form a cooperative raceway for the ball bearings.

The outer marginal portion 16$^B$ of the plate member 16 is positioned adjacently and in contact with the intermediate portion 15$^B$ of the plate member 15.

The outer portion of the plate member 15 is bent right-angularly, as at 15$^C$, and then its outer marginal portion 15$^D$ is bent in right-angularly in reverse direction to form an inner tread portion 15$^D$ which extends over the peripheral edge of the plate member 16 and into the plane of such plate member 16.

The combined outer tread and retainer 18 comprises a tread portion 18$^A$ which extends around the entire outer face of the inner tread portion 15$^D$, around the edge of said portion 15$^D$ and under a part of its under side. The inner marginal portion 18$^B$ is bent or flanged right-angularly to the tread portion 18$^A$ and is disposed against the outer side of the marginal portion 16$^B$ of the plate member 16.

The marginal portion 18$^B$ is also formed with integral spaced extensions 18$^C$ which are bent right-angularly to the portion 18$^B$ and arranged to be projected through aligned slots 16$^C$ cut into the marginal edge of the plate member 16. The extensions 18$^C$ also pass through the plate member 15 through openings 15$^E$.

Figure 4:
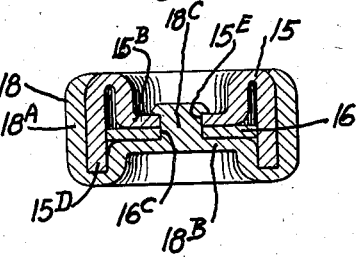
Fig. 4 is a cross section taken on line 4—4 of Fig. 1.

When the ends of the extensions 18$^C$ are riveted over, as shown in Figs. 1 and 4, the tread member 18 will securely retain the two plate members 15 and 16 in juxta-position.

From the above description it will be readily apparent that I have provided a roller which is provided with a double tread consisting of the portions 15$^D$ and 18$^A$ and that the tread member 18 also acts as a retainer for the two plate members 15 and 16.

I claim:

1. A ball bearing roller having a hub provided with an enlarged portion having a raceway for a plurality of ball bearings, a web comprising a pair of adjacently mounted plate members, both of said plate members having their inner marginal portions spread apart to extend around the ends of said enlarged hub portion and providing between said spread portions a co-operative raceway for said ball bearings, one of said plate members having an outer marginal portion bent right-angularly to form an inner tread, and a retainer having a tread portion surrounding said inner tread and having a plurality of spaced integral extensions extending through both of said plate members and being riveted over their ends to thereby retain said plate members in juxta-position.

2. A ball bearing roller having a hub provided with an enlarged portion having a raceway thereon for a plurality of ball bearings, a web comprising a pair of adjacently mounted plate members having their inner marginal portions spread apart to extend around the ends of said enlarged hub portion and providing a cooperative raceway between said spread portions, one of said plate members having a right angularly bent flange at its outer marginal portion, the other of said plate members having its outer peripheral edge in abutment with said flange, a combined tread and retainer having a tread portion disposed around the outer face of said flange and extending around one edge of said flange and under a part of the inner face of said flange, said combined tread and retainer having a marginal portion disposed into contact with the side of said other plate member, and means extending from said combined tread and retainer marginal portion through both of said plate members for securely retaining said plate members in juxta-position.

3. A ball bearing roller comprising a hub having a raceway thereon for a plurality of ball bearings, a web consisting of a pair of plate members, said plate members having their centers apertured to receive said hub, the inner marginal portions of said plate members being spread apart to form a housing for the roller bearings and the central portions of said plate members being in abutment with one another, one of said plate members having an outer flange bent right angularly, a combined tread and retainer having a tread portion extending around said flange and a bent portion in contact with said central portion of one of said plate members, and a plurality of spaced extensions formed integrally with said combined tread and retainer which extend through both of said plate members and are deformed at their ends to thereby retain said plate members in juxta-position.

4. A roller having a hub, a pair of plate members having portions thereof in juxta-position and being mounted for rotation on said hub, the inner marginal portions of said plate members being spread apart to form a housing for a plurality of ball bearings mounted therebetween, one of said plate members having a right-angularly bent flange to form an inner tread portion, and a tread member having a tread portion extending around and over said inner tread portion to thereby form an outer tread for the roller, said tread portion of said tread member having a bent flange extending into contact with one of said plate members, and a plurality of spaced extensions formed integrally with said tread member flange and adapted to be projected through both of said plate members and riveted over to thereby retain said plate members in juxta-position.

5. A roller including a hub, a pair of plate members forming a web member for the roller, said web member being mounted for rotation on said hub, one of said plate members having an outer marginal portion bent to form an inner tread for the roller, a combined outer tread and retainer comprising a tread portion disposed around the outer face of said inner tread and being bent around one edge of said inner tread and having a marginal extension lying adjacent to one of said plate members, and a plurality of spaced projections formed integrally with said marginal extension projecting through both of said plate members and adapted to be deformed to thereby retain said plate members as a unit web member.

6. A ball bearing roller having a hub provided with a raceway for a plurality of ball bearings, a pair of adjacently mounted plate members forming a web member for the roller and having their inner marginal portions spread apart to extend around said hub raceway, said spread portions providing a co-operative raceway for the ball bearings, one of said plate members having its outer marginal portion bent to form an inner tread for the roller, and an outer tread member disposed around the outer face of said inner tread portion, and means for securing said outer tread member and said pair of plate members to form a unit roller revolvable about said hub.

7. A ball bearing roller having a hub provided with a raceway for a plurality of ball bearings, a pair of adjacently mounted plate members forming a web member for the roller and having their inner marginal portions spread apart to extend around said hub raceway, said spread portions providing a co-operative raceway for the ball bearings, one of said plate members having its outer marginal portion bent to form an inner tread for the roller, and an outer tread member disposed around the outer face of said inner tread portion, the other of said plate members having its outer marginal portion disposed perpendicularly to the longitudinal axis of the hub and constituting substantially a circular center support for both of the treads, and means for securing said outer tread member and said pair of plate members to form a unit roller revolvable about said hub.

8. A roller including a hub, a pair of plate members forming a web member for the roller, said web member being mounted for rotation about said hub, one of said plate members having an outer marginal portion bent to form an inner tread for the roller, an outer tread member comprising a tread portion disposed around the outer face of said inner tread and being bent around one edge of said inner tread and having a marginal extension lying adjacent to one of said plate members, and means for securing said outer tread member and said plate members to form a unit roller revolvable about said hub.

JAMES McLELLAND.